United States Patent [19]

Larson et al.

[11] Patent Number: 5,567,221
[45] Date of Patent: Oct. 22, 1996

[54] COMPOSITIONS AND METHODS FOR USE IN AQUACULTURE

[75] Inventors: Steven D. Larson, Houston, Tex.; Richard J. Kastner, Gulfport, Mich.

[73] Assignee: OMS Investments, Inc., Wilmington, Del.

[21] Appl. No.: 368,046

[22] Filed: Jan. 3, 1995

[51] Int. Cl.$^6$ .................. C05C 9/00; A01K 61/00; C05G 5/00
[52] U.S. Cl. .................. 71/28; 71/64.07; 71/64.11; 71/64.13; 119/212; 119/230; 47/1.4
[58] Field of Search .................. 71/64.07, 64.11, 71/64.13, 28–30, 11, 63; 119/200, 212, 215, 230, 231, 242, 243; 47/1.4

[56] References Cited

U.S. PATENT DOCUMENTS

| | | | |
|---|---|---|---|
| Re. 32,356 | 2/1987 | Cardarelli | 424/78 |
| 3,197,302 | 7/1965 | MacBride | 71/37 |
| 3,916,832 | 11/1975 | Sweeney | 119/215 |
| 4,055,974 | 11/1977 | Jackson, Jr. | 71/11 |
| 4,137,868 | 2/1979 | Pryor | 47/1.4 X |
| 4,378,238 | 3/1983 | Goertz | 504/101 |
| 4,657,576 | 4/1987 | Lambie | 71/64.07 |
| 5,089,041 | 2/1992 | Thompson et al. | 71/64.11 |
| 5,219,465 | 6/1993 | Goertz et al. | 71/28 |
| 5,300,135 | 4/1994 | Hudson et al. | 71/28 |

OTHER PUBLICATIONS

Arce, G. A. and C. E. Boyd. "Effects of Agricultural Limestone on Water Chemistry, Phytoplankton Productivity and Fish Production in Soft Water Ponds". Transactions of the American Fisheries Society. Apr. 1975. 104:308–312.
Bennett, G. W. Management of Lakes and Ponds. Van Nostrand Reinhold Co., New York, NY. 1971. 375 pp. No Month.
Boyd, C. E. "Phosphorus Dynamics in Ponds". Proceedings of 25th Annual Conference of the Southeastern Association of Game and Fish Commissioners. 1971. 25: 418–426. No Month.
Boyd, C. E. "Fertilization of Warmwater Fish Ponds". Journal of Soil and Water Conservation. 1981. 36:142–145. No Month.
Boyd, C. E. "Comparison of Five Fertilization Programs for Fish Ponds". Transactions of the American Fisheries Society. 1981. 110:541–545. No Month.
Boyd, C. E. "Liquid Fertilizers for Fish Ponds". Alabama Agricultural Experiment Station. 1982. 28:3–4. No Month.
Boyd, C. E. "Fluids Beat Granular in Fish Pond Trials". Solutions Magazine. 1984. No Month.
Boyd, C. E. "Water Quality in Ponds for Aquaculture". Alabama Agricultural Experiment Station Auburn University. 1990. 482 pp. No Month.
Boyd, C. E. and J. R. Snow. "Fertilizing Farm Fish Ponds". Alabama Agricultural Experiment Station Auburn University. 1975. Leaf.88. 8 pp. No Month.
Boyd, C. E. and J. W. Sowles. "Nitrogen Fertilization of Ponds". Transactions of the American Fisheries Society. 1978. 107:737–741. No Month.

Hauck, R. D. and M. Koshino. "Slow–Release and Amended Fertilizers". Fertilizer Technology & Use. Madison, Wisconsin. 1971. 455–493. No Month.
Hepher, B. "On the Dynamics of Phosphorus Added to Fishponds in Israel". Limnol. Oceanogr. 1958. 3:84–100. No Month.
Hepher, B. "I. The Effect of Fertilization on Fish Yields". Ten Years of Research in Fish Ponds Fertilization in Israel. 1962. Bamidgeh 14:29–38. No Month.
Hepher, B. "II. Fertilizers Dose and Frequency of Fertilization". Ten Years of Research in Fishpond Fertilization in Israel. 1963. Bamidgeh 15: 78–92. No Month.
Lawrence, J. M. "A New Method of Applying Inorganic Fertilizer to Farm Fishponds". The Progressive Fish–Culturist. 1954. 16:176–178. No Month.
Lunt, O. R., J. J. Oertli, and A. M. Kofranek. "Coated Fertilizers 'Meter Out' Plant Nutrients". Crops & Soils. 1962. 14:14–15. No Month.
Metzger, R. J. and C. E. Boyd. "Liquid Ammonium Polyphosphate as a Fish Pond Fertilizer". Transactions of the American Fisheries Society. 1980. 109:563–570. No Month.
Mortimer, C. H. Fertilizers in Fishponds. Her Majesty's Stationary Office, London. 1954. Fish. Publ. No. 5. 155 pp. No Month.
Neess, J. C. "Development and Status of Pond Fertilization in Central Europe". Transactions of the American Fisheries Society. 1946. 76:355–358. No Month.
Nichols, W. C. "Application of Liquid Fertilizer to Hatchery Ponds". Progressive Fish–Culturist. 1983. 45:223–225. No Month.
Oertli, J. J. and O. R. Lunt. "Controlled Release of Fertilizer Minerals by Incapsulating Membranes: I. Factors Influencing the Rate of Release". Soil Science Society Proceedings. 1962. 26:579–583. No Month.
Parks, R. W., E. Scarsbrook, and C. E. Boyd. "Phytoplankton and Water Quality in a Fertilized Fish Pond". Agricultural Experiment Station Auburn University, Auburn, AL. Cir. 224. 16 pp. No Date.
Rabanal, H. R. "The Effect of No Fertilization and Non–Nitrogenous Fertilization Upon the Chemistry of Water, the Plankton, Bottom Organism and Fish Production in Ponds That Had Received Complete (N–P–K) Fertilizers for the Preceding 15–year Period". Ph.D. dissertation. Auburn University, Auburn, AL. 95 pp. No Date.
Reeves, W. C. and F. R. Harders. "Liquid Fertilization of Public Fishing Lakes in Alabama". Proc. Annu. Conf. SEAFWA. 1983. 37:371–375 No Month.

(List continued on next page.)

*Primary Examiner*—Ferris Lander
*Attorney, Agent, or Firm*—Jones, Day, Reavis & Pogue

[57] ABSTRACT

Controlled release fertilizer compositions which release fertilizer at a controlled rate over an extended period of time are employed in aquaculture treatment methods whereby nutrients are efficiently and effectively released into closed aquatic ecosystems such as ponds, lakes, watersheds and other aqueous environments over a period of time in order to enhance the growth of phytoplanktonic algae populations in the water and to thereby promote marine life populations.

14 Claims, No Drawings

OTHER PUBLICATIONS

Smith, E. V. and H. S. Swingle. "The Relationship Between Plankton Production and Fish Production in Ponds". Transactions of the American Fisheries Society. 1938. 68:309–315. No Month.

Smith, E. V. and H. S. Swingle. "Effect of Organic and Inorganic Fertilizers on Plankton Production and Bluegill Bream Carrying Capacity of Ponds". Transactions of the American Fisheries Society. 1939. 69:257–263. No Month.

Smith, E. V. and H. S. Swingle. "The Use of Fertilizer for Controlling Several Submerged aquatic Plants in Ponds". Transactions of the American Fisheries Society. 1941. 71:94–101. No Month.

Swingle, H. S. "Fertilizing Farm Fish Ponds". Agricultural Experiment Station of Auburn University. 1965. Res. 12:11. No Month.

Swingle, H. S. and E. V. Smith. "Fertilizers for Increasing the Natural Food for Fish in Ponds". Transactions of the American Fisheries Society. 1939. 68:126–135. No Month.

Swingle, H. S. and E. V. Smith. "Management of Farm Fish Ponds". Alabama Agricultural Experiment Station. Bull. 254, Auburn, AL. 1947a. 32 pp. No Month.

Swingle, H. S. "Experiments on Pond Fertilization". Alabama Agricultural Experiment Station Bull. 264, Auburn, AL. 1947b. 36 pp. No Month.

Swingle, H. S., B. C. Gooch, and H. R. Rabanal. "Phosphate Fertilization of Ponds". Annual Conference of the Southeastern Association of Game and Fish Commissioners. 1963. 17:213–218. No Month.

Wiebe, A. H. "The Effects of Various Fertilizers on Plankton Production". Transactions of the American Fisheries Society. 1929. 59:94–105. No Month.

Dobbins, D. A. and C. E. Boyd. "Phosphorus and Potassium Fertilization of Sunfish Ponds". Transactions of the American Fisheries Society. 1976. 105:536–540. No Month.

COMPOSITIONS AND METHODS FOR USE IN AQUACULTURE

BACKGROUND OF THE INVENTION

1. Field of the Invention

This invention relates to compositions and methods for use in aquaculture. More particularly, it relates to methods employing controlled release fertilizer compositions to release nutrients into closed aquatic ecosystems such as ponds, lakes, watersheds and other aqueous environments in order to enhance the growth of phytoplanktonic algae populations in the water and to thereby promote marine life populations.

2. Description of Related Art

Fertilization has been recognized heretofore as being an important technique in management of closed aquatic ecosystems such as ponds, lakes, watersheds and the like, particularly for purposes of stimulating the growth of phytoplanktonic algae in the water. Such phytoplanktons serve as the basis of the food chain in such aquatic environments and are, therefore, necessary for increasing fish production in these closed aquatic ecosystems. In addition, proper fertilization techniques have been shown to serve several other useful functions including limiting the growth of troublesome aquatic weeds in the closed aquatic environment and improving water quality.

For most freshwater ponds and lakes, phosphorus is considered to be a key nutrient in fertilizers, but inclusion of nitrogen and other nutrients in the fertilizers has been recognized to be desirable. However, phosphorus is the limiting nutrient for development of phytoplanktonic algal blooms. Thus, most ponds require frequent addition of fertilizers rich in phosphorus to maintain good phytoplankton blooms throughout a production cycle. Frequent fertilization with phosphorus is needed because available phosphorus is quickly adsorbed by pond muds or taken up by phytoplankton. Once adsorbed onto pond muds, little phosphorus is released back into pond waters, because the oxidized water-mud interface acts as a barrier between mud and overlying surface waters.

Pond and lake fertilization has undergone several stages of development over time. Recently, these changes have resulted from attempts to reduce the rising cost of fertilization and to respond to concerns relating to the effects of fertilizer on the environment.

In early fertilization programs, granular N-P-K fertilizers such as 8-8-2 or 20-20-5 compositions were simply broadcast over shallow areas of ponds, or poured from a boat along the shallow water edges. Later research demonstrated that placing fertilizers on an underwater platform produced similar results, required less fertilizer, and was less time-consuming. Wind and wave action were found to distribute nutrients throughout the pond and to make them more readily available to phytoplankton rather than tied up by pond muds. A single, well-placed platform could service a pond with up to 6 surface hectares (ha) of water. Subsequent findings indicated that ponds with a history of fertilization required only phosphorus fertilization and costs could be substantially reduced.

Despite the proven performance of fertilizer platforms, few pond owners used platforms in actual practice. Probably the biggest breakthrough in the use of fish pond fertilizers came in the form of liquid fertilizers. Besides the superiority of liquid fertilizers over granular fertilizers in increasing fish yields, liquid fertilizers had several other attractive attributes. Liquid fertilizers which are almost totally soluble in pond or lake water if properly applied could be used effectively at reduced application rates relative to prior granular products, were relatively easy and safe to apply, and were relatively economical to use.

Thus, it has been known previously to apply common, soluble fertilizers to ponds and lakes in order to increase inorganic nutrient concentrations, to favor greater phytoplankton growth and to ultimately enhance production of fish and/or crustaceans in the aquatic ecosystem. Current practice involves the use of liquid fertilizers or common, soluble granular fertilizers such as urea, ammonium, phosphates, ammonium polyphosphate, potassium sulfate and the like which are applied to closed aquatic ecosystems such as ponds and lakes throughout a production cycle. Frequent applications are required to keep the nutrients available in solution.

However, the prior art techniques have been unable to overcome problems presented by the need for constant availability of nutrients for growth of phytoplanktons and the fact that the previously proposed fertilizer products for use in aquaculture have provided nutrient availability for only a short duration of time after application. Accordingly, it has been necessary heretofore to apply such fertilizers up to 8–10 times per production cycle in order to maintain uniform phytoplankton growth within a given closed aquatic ecosystem such as a pond or a lake. If such an application schedule is not followed, it has been found that fish production in the environment suffers. Of course, such repeated application schedules are expensive, inefficient and time consuming.

Thus, the use of inorganic granular fertilizers in aquaculture has been considered to be costly and inefficient because of rapid dissolution of most fertilizer materials and leaching into the aquatic ecosystem and the inability to utilize nutrients efficiently.

SUMMARY OF THE INVENTION

Accordingly, it is a primary object of the present invention to provide compositions and methods which overcome the problems and deficiencies which have been encountered in regard to prior art fertilization techniques employed in aquaculture.

A further object is to provide methods for applying fertilizers to a closed aquatic ecosystem in a manner such that adequate nutrients are provided to support growth of phytoplanktons therein, over an extended period of time, without requiring multiple fertilizer applications.

Another object is to provide fertilizer products which may be applied in a single application to closed aquatic ecosystems such as ponds, lakes, watersheds and other aquatic environments and at lower dosage rates than previously utilized products in order to achieve satisfactory growth of phytoplankton populations in the environment over an extended period of time.

A further object is to provide a method and composition for effectively fertilizing fish ponds, lakes, watersheds and like aquatic environments in a more efficient and cost effective manner than has been accomplished heretofore.

The foregoing and other objects of this invention are achieved by providing controlled release fertilizer compositions which release nutrients at a controlled rate over an extended period of time for treating closed aquatic ecosystems such as ponds, lakes, watersheds and like aquatic environments. Such controlled release materials are formulated to delay or reduce the rate of nutrient delivery to the aquatic environment.

Controlled release fertilizer technology has been widely used heretofore in the agricultural and horticultural fields for a considerable amount of time and encompasses the controlled delivery of plant nutrients, i.e., fertilizers, as well as control chemicals (e.g., herbicides, insecticides, fungicides and the like) to a target in a manner which maximizes its efficient use, minimizes potential negative effects associated with overdosage, and/or extends the time in which sufficient dosages are delivered. However, such fertilizer products have not been employed heretofore in aquaculture.

Exemplary of the advantages attained in using controlled release fertilizers in aquaculture is that pond fertilization is simplified to a one-or-two step operation during each production cycle. Furthermore, controlled release fertilizer compositions can be used at low application rates and in pond systems with moderate water exchange. Further, controlled release fertilizer compositions are safe to use in pond waters and are readily available from commercial sources.

Accordingly, the methods of the present invention are based on the use of controlled release fertilizers to release nutrients into closed aquatic ecosystems such as ponds, lakes, watersheds and other aqueous environments in order to promote the growth of phytoplanktonic algae in the water in a more efficient and cost effective manner than has been accomplished employing previously known aquaculture fertilization techniques.

DETAILED DESCRIPTION OF THE PREFERRED EMBODIMENTS

In general, the method of the present invention includes the application of a controlled release fertilizer into a closed aquatic ecosystem. The controlled release fertilizer is formed from a particulate core material having a release material reacted with or coated thereon. The release material is present in an amount sufficient to provide slow release of the core material into the surrounding aquatic environment in sufficient quantities to promote phytoplankton populations to support marine life in the aquatic ecosystem over an extended period of time.

Marine life which are supported by the phytoplankton algae populations in the aquatic environment include a wide variety of fresh water, brackish water and salt water fish as well as crustaceans such as shrimp, shellfish, crawfish and the like. The expression "marine life" as employed herein is intended to encompass all such forms of aquatic life. Thus, the use of controlled release fertilizers as nutrient delivery systems to enrich aquatic phytoplankton populations in aquaculture production in lakes and ponds has important implications from the standpoint of such enterprises as sport fish ponds; catfish, bait fish and crawfish production ponds; shrimp farm ponds; tropical fish production; exotic aquaculture such as alligator, eel and other novelty or high value crops; fish hatchery ponds and the like.

Suitable fertilizer compositions for use herein have been referred to in the agricultural and horticultural fields under various designations including controlled release, controlled availability, slow-release, slow acting, metered release, linear release and delayed release fertilizers (all of which are collectively referred to herein as "controlled release" fertilizers).

Controlled release fertilizers for use in this invention are granular fertilizers which may be prepared either as reaction products or as coated products. Examples of granular controlled release fertilizer reaction products for use herein are urea-formaldehyde (UF) reaction products such as ureaform, methylene ureas and MDU/DMTU compositions as described, for example, in U.S. Pat. No. 4,378,238, entitled: "Controlled Release Particulate Fertilizer Composition", the disclosure of which is incorporated herein by reference; urea-other aldehyde reaction products such as isobutylidene diurea (IBDU), guanyl ureas, and crotonylidene diurea (CDU); and other reaction products such as oxamide and melamine fertilizers, inorganic metal complexes such as magnesium-ammonium phosphate (magamp), magnesium-potassium phosphate and the like.

Coated controlled release fertilizers for use in accordance with this invention are products in which soluble fertilizer core granules (substrates) are covered with a water insoluble or semipermeable coating or release material which limits or controls the rate of water penetration to the soluble fertilizer cores, and controls the release rate of solubilized fertilizer from within the granules to the external environment. In preferred embodiments of the present invention the coating or release material is applied on the core material in an amount of about 0.5 to 35% (by weight).

Examples of coated granular controlled release fertilizers are those using sulfur as the coating material; those that employ a wax and/or a polymeric material and those hybrid products that utilize a multilayer coating of sulfur and polymer. Polymers suitable for use herein include polyvinyl chloride, polyvinylidene chloride, polyethylene, polypropylene, polyethylene terephthalate, polyurethane, polyamides, copolymers of dicyclopentadiene and vegetable oils such as linseed or soybean oil, copolymer blends of predominantly vinylidene chloride monomers and ethylenically unsaturated comonomers, salts of sulfonated elastomers and mixtures thereof. Furthermore, polymer coatings described in U.S. Pat. No. 4,657,576, entitled: "Granular Fertilizer Composition Having Controlled Release and Process for the Preparation Thereof"; U.S. Pat. No. 5,089,041, entitled: "Encapsulated Slow Release Fertilizers"; U.S. Pat. No. 5,300,135, entitled: "Abrasion Resistant Coatings for Fertilizers"; and U.S. Pat. No. 5,219,465, entitled "Sulfur Coated Fertilizers and Process for the Preparation Thereof" the disclosures of which are incorporated herein by reference, are particularly suited for use herein.

In addition, it is advantageous to incorporate oxidant materials such as peroxides, nitrates and mixtures thereof in the controlled release fertilizer compositions of this invention or to provide such oxidants in combination with the controlled release fertilizer compositions. Preferred oxidant materials for use herein include calcium peroxide, sodium peroxide, potassium peroxide, calcium nitrate, sodium nitrate, potassium nitrate, ammonium nitrate, magnesium nitrate and mixtures thereof.

Also, it is advantageous to formulate micronutrient materials such as iron, zinc, boron, calcium, magnesium, sulfur, manganese, copper, molybdenum, cobalt and mixtures thereof along with the nitrogen, phosphorus and/or potassium cores or the micronutrients can be formulated separately in the compositions of this invention. The micronutrients themselves may be formulated collectively or separately. It is particularly preferred to incorporate such micronutrients for purposes of aquaculture as chelates or salts in the form of nitrates, phosphates, oxides, chlorides, borates, molybdates, sulfates and mixtures thereof into or with the present compositions.

Aquaculture fertilizer production requirements vary widely depending on crop, water quality and environmental conditions. Typical suggested rates for nitrogen, phosphorus and potassium per production cycle are:

nitrogen (N)—0–100 lbs per surface acre phosphorus ($P_2O_5$)—0–800 lbs per surface acre potassium ($K_2O$)—0–50 lbs per surface acre The fertilizer core materials are specifically formulated to release from one month to twelve months, depending upon the environmental and production parameters. Typical fertilizer core materials will be formulated to release for 8 to 9 months in the southern United States.

The following examples are provided to illustrate the preferred embodiments of the present invention including preferred compositions and methods for their use, and comparative evaluations with prior art compositions and methods. All percentages are percent by weight unless otherwise indicated.

EXAMPLE 1

Tests were conducted in earthen ponds at the Auburn University Fisheries Research Unit, Auburn, Alabama. One test utilized six, 0.04 hectare (ha) ponds and another test used a 0.022-ha pond. The Ponds were shallow and ranged in depth from 0.25 m near edges to 1.5 m at the turndown drain pipes. Ponds averaged 1 m in depth. Water levels were maintained by weekly additions of soft, low nutrient content water from a nearby reservoir located on a forested watershed.

Several practices were followed to enhance water quality management in the ponds. Inlet pipes were covered with a heavy duty sock material to prevent entry of wild fish or harmful invertebrates. Following harvest the previous year, ponds were completely drained and allowed to dry thoroughly. Tall stands of terrestrial grasses were sprayed with glyphosate, or removed manually before pond filling. Plastic screens were fitted in all turndown drain pipes to prevent accidental escape of fish, and extenders (pieces of 10-cm-diameter PVC pipe) were placed on turndown drain pipes in some ponds to maintain similar volumes in all ponds. Agricultural lime was spread over pond bottoms at a rate of 600 kg/ha.

Box-like wooden platforms (interior dimensions 114 cm×60 cm×9 cm deep) for placement of controlled release fertilizer samples (referred to hereinafter as "CRF samples") and instant release, soluble granular fertilizer samples (referred to hereinafter as "granular fertilizer samples") were constructed and anchored to existing piers such that platforms were about 30 cm underwater. Granular fertilizer sample treatments were based on a "standard" application rate of 9 kg $P_2O_5$/ha and ten applications per season. Ponds were randomly divided into three treatment groups. One treatment group was a control in which granular fertilizer was applied as the fertilizer source. In the other two treatment groups, CRF fertilizer samples were employed at 100% and 50% application rates, respectively.

Nutrient sources for the soluble granular fertilizer samples were ammonium nitrate (33.5% N), triple superphosphate (46% $P_2O_5$), and muriate of potash (60% $K_2O$). The nutrient constituents of the CRF samples were ammonium nitrate (33.5% N), ammonium phosphate (11–18% N, 48% $P_2O_5$), and potassium sulfate (50% $K_2O$).

The CRF samples employed for purposes of this testing were readily available, commercial products sold under the trademark "Osmocote" by the Grace Sierra Company (now The Scotts Company). This product consists of small prills (3–5 mm diameter). Each prill has a controlled release coating made from a vegetable oil (e.g., linseed or soybean oil) reacted with cyclic diene to produce a dicyclopentadiene copolymeric product as disclosed in U.S. Pat. No. 4,657,576, which is incorporated herein by reference.

The Osmocote controlled release fertilizers used in this testing had a grade of 13-13-13 (%N, %$P_2O_5$, %$K_2O$) and have been found to be particularly suitable for use in the present invention.

The controlled release fertilizer treated ponds received a one time 45 or 90 kg (N, $P_2O_5$, $K_2O$)/ha application on March 21. The granular soluble fertilizer treated ponds received a 9 kg (N, $P_2O_5$, $K_2O$)/ha application on March 21, and this was repeated on April 5, April 18, May 9, May 30, June 21, July 20, August 20, and September 20 to provide application rates in accordance with the data in the following Table 1:

TABLE 1

Amounts of fertilizer constituents per yearly season for three different treatments was replicated twice.

| Treatment | Application rate (kg/ha per season) | | |
|---|---|---|---|
| | N | $P_2O_5$ | $K_2O$ |
| Granular Fertilizer Samples* | 90 | 90 | 90 |
| 100% CRF Samples | 90 | 90 | 90 |
| 50% CRF Samples | 45 | 45 | 45 |

*This translates into 9 kg (N, $P_2O_5$, $K_2O$)/ha per individual application.

In late February, all ponds were stocked with bluegill (*Lepomis macrochirus*) and redear sunfish (*L. microlophus*) at a rate of 6000/ha, or 240 fish per pond. The average live weight per fish was 1 g. Between March 16 and April 13, a total of 13 grass carp (*Ctenopharyngodon idella*), having a mean stocking weight of 13 g were released into all ponds for weed control. Twenty, 11-g tilapia (*Tilapia nilotica*) fingerlings were stocked into all ponds on May 16. Ponds were drained during the first week of October, and fish were collected and weighed for total production. Counts and weights for each fish species were also recorded, and yields and percent survival in this test were calculated and are tabulated in the following Table 2:

TABLE 2

Summary of mean fish production values in ponds which received a standard dosage of granular fertilizer (13-13-13) and two levels of a controlled release fertilizer (13-13-13). Each treatment was replicated twice.

| Measurement | Treatment | | |
|---|---|---|---|
| | Granular Fertilizer Samples | 100% CRF Samples | 50% CRF Samples |
| Yield of bluegill (kg/ha) | 95 | 99 | 32 |
| Yield of tilapia (kg/ha) | 77 | 63 | 34 |
| Yield of tilapia & bluegill juveniles | 1256 | 1236 | 689 |
| Yield of grass carp (hg/ha) | 281 | 189 | 240 |
| Total yield (kg/ha) | 1709 | 1588 | 995 |
| Average bluegill wt. (g) | 23.5 | 26 | 22.5 |
| % survival of original stock | 69 | 63 | 22 |
| Average tilapia wt. (g) | 190 | 124 | 94.5 |
| % survival of original stock | 83 | 100 | 75 |
| Average grass carp wt. (g) | 1386 | 664 | 873 |
| % survival | 67 | 80 | 89 |

Two water samples per pond were collected from two locations with a 90-cm water column sampler and placed into one-liter polyethylene bottles. Water analyses were generally done the same day. All samples were analyzed for soluble reactive P (SRP), total P (TP), total ammonia-N (TAN), nitrate-N, pH, and chlorophyll a. Secchi disk and light-dark bottle measurements were also made. Biweekly, total alkalinity and total hardness were determined. SRP, TP, pH, chlorophyll a, light-dark bottle, total alkalinity, and total hardness analyses followed procedures given by the American Public Health Association (1992). Hach procedures (1989) using a modification of the Cadmium Reduction Method (Nitra Ver 5) were followed to analyze nitrate-N. The salicylate method was used for determination of TAN. A third sample was taken in situ in a 125-ml polyethylene bottle and analyzed for K by the Inductively Coupled Plasma (ICP) method at the Auburn University Soil Testing Laboratory. Detection limits were 0.01 mg/L for SRP, 0.01 mg/L for TP, 0.02 mg/L for TAN, 0,005 for $NO_2$-N, 0.01 mg/L for $NO_3$-N, 0.07 mg/L for K, 0.5 mg/L for gross primary productivity, 5 mg/L for total alkalinity and hardness, 5 cm for Secchi disk depth, and 0.1 units for pH. Other useful nutrient and ion concentrations were measured as well by this method and included P, Ca, Mg, Na, Si, Cu, Fe, Mn, Zn, B, Mo, Al, Ba, Co, Cr, and Pb. Pond temperatures were measured daily with max/min thermometer. The results of this test are tabulated in the following Table 3:

TABLE 3

Summary of mean water quality variables in ponds which received a standard dosage of a granular fertilizer (13-13-13) and two levels of a controlled release fertilizer (13-13-13) during 1992. Each treatment was replicated twice.

| Variable | Treatment | | |
|---|---|---|---|
| | Granular Fertilizer Samples | 100% CRF Samples | 50% CRF Samples |
| TP (mg/L) | 0.16 | 0.17 | 0.09 |
| SRP (mg/L) | 0.10 | 0.07 | 0.03 |
| $NO_3$—N (mg/L) | 0.15 | 0.17 | 0.14 |
| TAN (mg/L) | 0.03 | 0.03 | 0.01 |
| Chlorophyll a (µg/l) | 31 | 26 | 20 |
| pH | 9.0 | 8.9 | 8.8 |
| Secchi visibility (cm) | 56 | 54 | 60 |
| Gross primary productivity (mg $O_2$/⅙ hr) | 2.2 | 2.9 | 1.4 |
| Alkalinity (mg/L as $CaCO_3$) | 38 | 40 | 39 |
| Hardness (mg/L as $CaCO_3$) | 39 | 41 | 39 |
| Potassium (mg/L) | 3.7 | 4.2 | 2.6 |

EXAMPLE 2

Twelve 0.02–0.07 hectare (ha) aquaculture ponds were treated with CRF fertilizer samples for purposes of evaluation during a series of tests which were conducted. These tests were carried out under similar conditions to those described above with regard to Example 1 except that soluble liquid fertilizer samples replaced the granular samples of Example 1.

Similar pond management practices were followed as in the prior testing. Baseline water samples indicated that total alkalinity was low (<20 mg/L as $CaCO_3$) in most ponds. Ponds were limed on March 17 at a rate of 700 kg/ha. Samples were tested at lower application rates (<90 kg $P_2O_5$/ha) per season as compared with the test conditions set forth in Example 1. Accordingly, in the second series of tests, ponds were randomly assigned to four treatment groups in accordance with Table 4 as follows:

TABLE 4

Amounts of fertilizer constituents per season for four different treatments. Nutrients were applied 6 times between April 20 and September 13 using a liquid fertilizer sample. A one-time application of CRF sample was based on an application rate of 9 kg $P_2O_5$/ha and ten applications per season. Each treatment was replicated three times.

| Treatment | Grade | Application rate (kg/ha per season) | | |
|---|---|---|---|---|
| | | N | $P_2O_5$ | $K_2O$ |
| Liquid Fertilizer Sample | 10-34-0 | 26.5 | 90 | 0 |
| 50% CRF Sample | 13-13-13 | 90 | 90 | 90 |
| 25% CRF Sample | 13-13-13 | 22.5 | 22.5 | 22.5 |
| 12.5% CRF Sample | 13-13-13 | 11.3 | 11.3 | 11.3 |

The nutrient source for the liquid fertilizer treatments was ammonium polyphosphate (10% N, 34% $P_2O_5$). Application of the liquid fertilizer consisted of diluting it in a bucket of water and broadcasting it evenly over pond surfaces. Fertilizers were added to all ponds on April 20. The liquid fertilizer treatment ponds also received fertilizer applications on May 11, June 7, June 22, July 19, and August 16.

Despite fertilization, few ponds (2) had phytoplankton blooms. On May 20, a decision was made to systematically drain (80% volume), manually remove problematic weeds and algae, and refill all ponds. This work was done over a two week period. Because of this action, existing Osmocote fertilizer was removed and replaced in all controlled release treatment ponds on June 7. On June 9, all ponds were limed again (600 kg/ha).

In late February, all ponds were stocked with juvenile sunfish at a rate of 6000 fish/ha. Between March 1 and May 26, ponds were stocked with grass carp at a rate of 125 fish/ha. Ponds were drained between Sep. 13 and 15, 1993, and fish were collected. All fish recovered were weighed and counted. Weight/length measurements were taken for all grass carp. For juvenile sunfish, the number of fish was estimated from weighed and counted samples. These data were used to calculate yield and percent survival for adult sunfish, juvenile sunfish, and grass carp as set forth in the following Table 5:

TABLE 5

Summary of mean fish production values in ponds which received a standard dosage of a liquid fertilizer (10-34-0) and three levels of a controlled release fertilizer (13-13-13). Each treatment was replicated three times.

| Measurement Application Rate | Treatment | | | |
|---|---|---|---|---|
| | Liquid Fertilizer Sample | CRF Sample (50%) | CRF Sample (25%) | CRF Sample (12%) |
| Yield of bluegill (kg/ha) | 90 | 99 | 93 | 86 |
| Yield including juveniles (kg/ha) | 259 | 233 | 360 | 183 |
| Yield of grass carp (kg/ha) | 147 | 163 | 135 | |
| Total yield (kg/ha) | 408 | 397 | 495 | 272 |
| Average bluegill wt. (g) | 22.4 | 17.9 | 16.9 | 17.5 |
| % survival | 73 | 99 | 102 | 90 |
| Est. juvenile (g) | 0.81 | 0.76 | 0.77 | 0.93 |
| Average grass carp wt. (g) | 1405 | 617 | 677 | 466 |
| % survival | 76 | 172 | 104 | 121 |

In addition, the water quality was evaluated by the same procedures set forth in Example 1 and the results are tabulated in the following Table 6:

TABLE 6

Summary of mean water quality variables in ponds which received a standard dosage of a liquid fertilizer (10-34-0) and three levels of a controlled release fertilizer (13-13-13). Each treatment was replicated three times.

| Variable Application Rate | Treatment | | | |
|---|---|---|---|---|
| | Liquid Fertilizer Sample (100%) | CRF Sample (50%) | CRF Sample (25%) | CRF Sample (12%) |
| $NH_4$—N (mg/L) | 0.02 | 0.07 | 0.02 | 0.02 |
| $NO_2$—N (mg/L) | 0.004 | 0.007 | 0.004 | 0.002 |
| $NO_3$—N (mg/L) | 0.23 | 0.35 | 0.23 | 0.16 |
| SRP (mg/L) | 0.06 | 0.03 | 0.02 | 0.01 |
| TP (mg/L) | 0.20 | 0.24 | 0.14 | 0.11 |
| Chlorophyll a (μg/l) | 59 | 75 | 66 | 35 |
| pH | 8.9 | 9.1 | 9.0 | 8.7 |
| Secchi visibility (cm) | 57 | 49 | 57 | 60 |
| Gross primary productivity (mg $O_2$/⅙ hr) | 2.4 | 3.2 | 2.8 | 2.1 |
| Alkalinity (mg/L as $CaCO_3$) | 32 | 31 | 32 | 39 |
| Hardness (mg/L as $CaCO_3$) | 35 | 34 | 35 | 44 |
| Potassium (mg/L) | 2.1 | 2.7 | 2.7 | 2.7 |
| Weed coverage (% of bottom) | 42 | 21 | 21 | 18 |

The present studies have demonstrated that controlled release fertilizers can be used at much lower rates and give similar results in terms of water quality and fish production as compared with prior art fertilization techniques. Furthermore, the use of the controlled release fertilizers in aquaculture enables the important commercial benefit of having to fertilize only once a season. Still further, controlled release fertilizers conserve valuable nutrient resources and work well in systems with moderate water exchange as demonstrated herein.

Although the invention has been described in its preferred forms with a certain degree of particularity, it is to be understood that the present disclosure has been made by way of example only. Numerous changes in the details of the compositions and in the operational steps of the methods and in the compositions utilized therein will be apparent without departing from the spirit and scope of the invention, as defined in the appended claims.

We claim:

1. A method for promoting marine life populations in a closed aquatic ecosystem comprising applying a controlled release fertilizer composition into said ecosystem, said controlled release fertilizer composition being formed from a particulate core material and a release material reacted with or coated on said core material, said core material being selected from the group consisting of phosphorus, nitrogen and potassium sources and mixtures thereof and said controlled release fertilizer composition being formulated to provide slow release of a sufficient amount of said core material from said release material into said closed aquatic ecosystem, in a single application of said controlled release fertilizer composition thereto, to promote stable growth of phytoplankton algae in said ecosystem without causing overly dense growth of said phytoplankton algae, whereby marine life populations in said closed aquatic ecosystem are maintained over an extended period of time.

2. The method of claim 1 wherein said composition is a urea-formaldehyde reaction product.

3. The method of claim 2 wherein said urea-formaldehyde reaction product is selected from the group consisting of ureaform, methylene ureas and MDU-DMTU compositions.

4. The method of claim 1 wherein said composition is selected from the group consisting of isobutylidene diurea, crotonylidene diurea, oxamide, melamine, magnesium-ammonium phosphate, magnesium-potassium phosphate, guanyl urea and mixtures thereof.

5. The method of claim 1 wherein said release material is a polymeric composition.

6. The method of claim 5 wherein said polymeric composition is selected from the group consisting of polyvinyl chloride, polyvinylidene chloride, polyethylene, polypropylene, polyethylene terephthalate, polyurethane, polyamides, copolymers of dicyclopentadiene and vegetable oil, copolymer blends of predominantly vinylidene chloride monomers and ethylenically unsaturated comonomers, salts of sulfonated elastomers and mixtures thereof.

7. The method of claim 5 wherein said polymeric composition is a dicyclopentadiene copolymeric product formed by reacting a vegetable oil with a cyclic diene.

8. The method of claim 1 wherein said release material is a sulfur coating.

9. The method of claim 8 wherein a polymeric topcoating is applied over said sulfur coating.

10. The method of claim 1 wherein an oxidant material is included with said controlled release fertilizer composition, said oxidant material being selected from the group consisting of peroxides, nitrates and mixtures thereof.

11. The method of claim 10 wherein said oxidant material is selected from the group consisting of calcium peroxide, sodium peroxide, potassium peroxide, calcium nitrate, sodium nitrate, potassium nitrate, ammonium nitrate, magnesium nitrate and mixtures thereof.

12. The method of claim 1 wherein a micronutrient material is included with said controlled release fertilizer composition, said micronutrient material being selected from the group consisting of iron, zinc, boron, calcium, magnesium, sulfur, manganese, copper, molybdenum, cobalt and mixtures thereof.

13. The method of claim 12 wherein said micronutrient material is a chelate or a salt selected from the group consisting of nitrates, phosphates, oxides, chlorides, borates, molybdates, sulfates and mixtures thereof.

14. The method of claim 1 wherein said release material is coated on said core material in an amount of about 0.5 to 35% (by weight).

* * * * *